United States Patent
Chen et al.

(10) Patent No.: US 8,653,428 B2
(45) Date of Patent: Feb. 18, 2014

(54) SOLAR-POWERED WIRELESS COMMUNICATION MODULE WITH DAYLIGHT INTENSITY MEASUREMENT

(75) Inventors: Po-Yen Chen, Taipei (TW); Ching-Ran Lee, Kinmen County (TW); Li-Ling Lee, Hsinchu County (TW); Ching-Tsa Pan, Hsinchu County (TW)

(73) Assignee: Industrial Technology Research Institute, Hsin-Chu (TW)

( * ) Notice: Subject to any disclaimer, the term of this patent is extended or adjusted under 35 U.S.C. 154(b) by 835 days.

(21) Appl. No.: 12/490,991

(22) Filed: Jun. 24, 2009

(65) Prior Publication Data

US 2010/0127155 A1    May 27, 2010

(30) Foreign Application Priority Data

Nov. 21, 2008    (TW) .............................. 97145038 A

(51) Int. Cl.
*G01J 1/32*    (2006.01)

(52) U.S. Cl.
USPC .......................................... 250/205; 136/252

(58) Field of Classification Search
USPC .......................................... 250/205; 136/252
See application file for complete search history.

(56) References Cited

U.S. PATENT DOCUMENTS 5,990,826 A * 11/1999 Mitchell ................... 342/357.64
2007/0229250 A1* 10/2007 Recker et al. ................. 340/531

FOREIGN PATENT DOCUMENTS

| CN | 1512286 A | 7/2004 |
|---|---|---|
| CN | 2738336 Y | 11/2005 |
| CN | 2874664 Y | 2/2007 |
| CN | 101163366 A | 4/2008 |
| TW | 571494 B | 1/2004 |
| TW | M309049 U | 4/2007 |
| TW | M344684 U | 11/2008 |

OTHER PUBLICATIONS

State Intellectual Property Office of the People's Republic of China, "Office Action", Aug. 31, 2011, China.
State Intellectual Property Office of the People's Republic of China, "Office Action", May 6, 2011, China.

* cited by examiner

*Primary Examiner* — Seung C Sohn
(74) *Attorney, Agent, or Firm* — Morris Manning & Martin LLP; Tim Tingkang Xia, Esq.

(57) ABSTRACT

The present invention relates to a solar-powered wireless communication module with daylight intensity measurement, which comprises: a solar cell module, capable of converting solar energy into electricity; a Microcontroller Unit (MCU), coupled to the solar cell module for detecting and outputting values regarding the voltage and the current of the electricity converted from the solar cell module; and a wireless communication unit, powered by the electricity from the solar cell module and coupled to the MCU for transmitting values outputted from the MCU to a control end.

6 Claims, 5 Drawing Sheets

SOLAR-POWERED WIRELESS COMMUNICATION MODULE WITH DAYLIGHT INTENSITY MEASUREMENT

FIELD OF THE INVENTION

The present invention generally relates to a smart independently power module controller and, more particularly, to a solar-powered wireless communication module with daylight intensity measurement using a solar cell module as an optical sensor and a power supply.

BACKGROUND OF THE INVENTION

The daylight provides free and clean energy that can be used in illumination applications for homes and factories. However, commercial office buildings that consume large power for illumination use less daylight resources. Therefore, there is need in combining daylight illumination and illumination management systems to use optical sensing devices to measure the sunlight intensity and adjustable electronic ballasts to provide illumination. Accordingly, the illumination quality can be maintained without unnecessary power consumption and lowered electricity bill.

The optical sensing module is a key device for daylight illumination control. The currently optical sensing module is disposed according to the occasion. However, since the circuit design is limited by upholstery, the use of wireless communication to transmit measured data to the control end is unlimited by upholstery. However, the installation of the power supply of wireless communication modules may limit the applications. Therefore, most wireless communication modules are powered by batteries that often cause problems due to lifetime, size, weight and pollution.

In the present invention, a solar cell module is used to power the wireless communication modules and report the daylight information to a control end.

SUMMARY OF THE INVENTION

In view of the above, the present invention provides a solar-powered wireless communication module with daylight intensity measurement, wherein a solar cell module is used as an optical sensor and a power supply. The maximum output power of a solar cell module varies with the change of sunlight intensity. In order to make the most of the solar cell module, it is required that the output current of the electricity converter is controlled so that the solar cell module outputs the maximum output power. The maximum output power of the solar cell module constructs a nearly straight line for different sunlight intensities, which is called linear approximation. Therefore, once the maximum output power of the present solar cell module is known, the present sunlight intensity can also be known. In this aspect, the solar cell module does not only provide electricity but also function as a sensor.

In order to achieve the foregoing object, the present invention provides a solar-powered wireless communication module with daylight intensity measurement, comprising: a solar cell module, capable of converting solar energy into electricity; a micro control unit (MCU), coupled to the solar cell module for detecting and outputting values regarding the voltage and the current of the electricity converted from the solar cell module; and a wireless communication unit, powered by the electricity from the solar cell module and coupled to the MCU for transmitting values outputted from the MCU to a control end.

BRIEF DESCRIPTION OF THE DRAWINGS

The objects and spirits of the embodiment of the present invention will be readily understood by the accompanying drawings and detailed descriptions, wherein.

DETAILED DESCRIPTION OF THE PREFERRED EMBODIMENTS

The present invention can be exemplified by but not limited to the preferred embodiment as described hereinafter.

Figure 1:
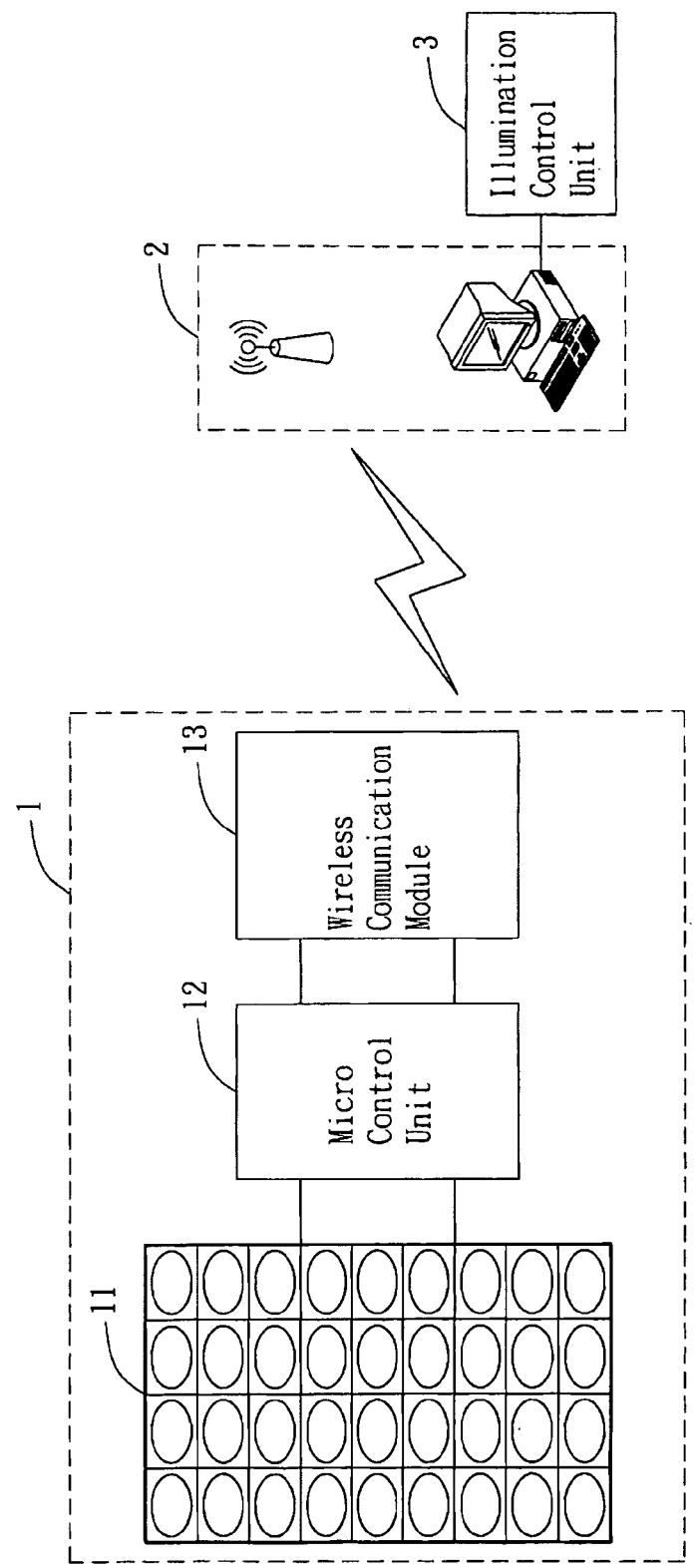
FIG. 1 is a schematic diagram showing a solar-powered wireless communication module with daylight intensity measurement capable of transmitting values regarding power to a control end according to the present invention.
Figure 2:
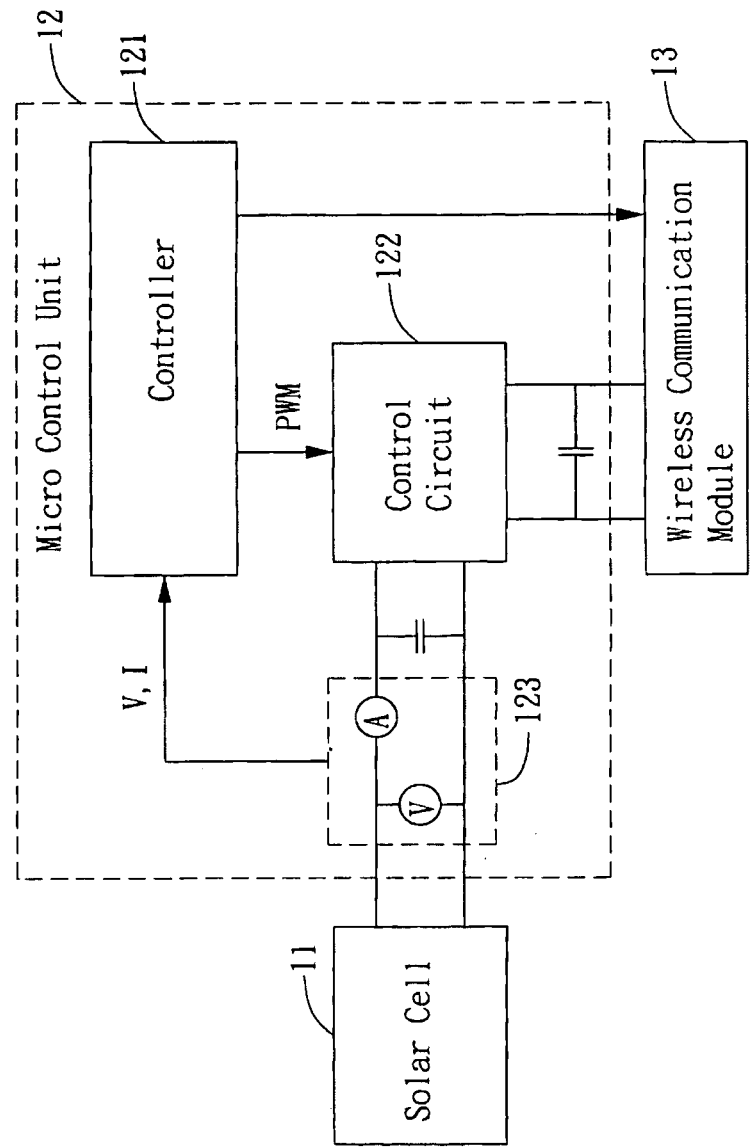
FIG. 2 is a block diagram of a solar-powered wireless communication module with daylight intensity measurement according to the present invention.

Please refer to FIG. 1 and FIG. 2, wherein FIG. 1 is a schematic diagram showing a solar-powered wireless communication module with daylight intensity measurement capable of transmitting values regarding power to a control end according to the present invention; and FIG. 2 is a block diagram of a solar-powered wireless communication module with daylight intensity measurement according to the present invention. The solar-powered wireless communication module with daylight intensity measurement comprises: a solar cell module 11, capable of converting solar energy into electricity; a micro control unit (MCU) 12 comprising a controller 121 and a control circuit 122, and being coupled to the solar cell module 11 for detecting and outputting values 123 regarding the voltage and the current of the electricity converted from the solar cell module; and a wireless communication unit 13, powered by the electricity from the solar cell module 11 and coupled to the MCU 12 for transmitting values outputted from the MCU 12 to a control end 2. The control end 2 comprises an illumination control unit 3. In the present embodiment, the illumination control unit 3 is an adjustable electronic ballast so that the brightness of a lamp is adjusted by adjusting the illumination control unit according to measured illumination. Therefore, the illumination quality can be maintained without unnecessary power consumption and lowered electricity bill. Moreover, the wireless communication module is capable of transmitting the measured data to the control end 2 without being limited by space, which is very convenient.

In illumination control unit applications, the optical sensors are used in bright environment. Therefore, the solar cell module is used as an optical sensor and a power supply for the wireless communication module so as to overcome problems due to power supply design. In this aspect, the cost and the size for circuitry can be reduced to achieve low power consumption and high competence. The maximum output power of a solar cell module varies with the change of sunlight intensity. In order to make the most of the solar cell module, it is required that the output current of the electricity converter is controlled so that the solar cell module outputs the maximum output power. The maximum output power of the solar cell module constructs a nearly straight line for different sunlight intensities, which is called linear approximation. Therefore, once the maximum output power of the present solar cell module is known, the present sunlight intensity can also be known. In this aspect, the solar cell module does not only provide electricity but also function as a sensor.

The voltage and current characteristics of a solar cell module can be expressed as:

$$I = I_s - I_o \left[ e^{\frac{q}{AKT}(V+IR_s)} - 1 \right] \quad (1)$$

where

I: the current of the solar cell module;

V: the voltage of the solar cell module;

$I_s$: the short-circuit current of the solar cell module, which is nearly proportional to the irradiance;

$I_o$: the reverse saturation current of the solar cell module;

A: the ideality factor (A=1~5) of the solar cell module;

K: Boltzmann constant ($1.381 \times 10^{-23}$ J/° K);

T: the temperature (absolute temperature) of the solar cell module;

q: $1.6 \times 10^{-19}$ c;

$R_s$: the equivalent serial resistance of the solar cell module.

Figure 3:
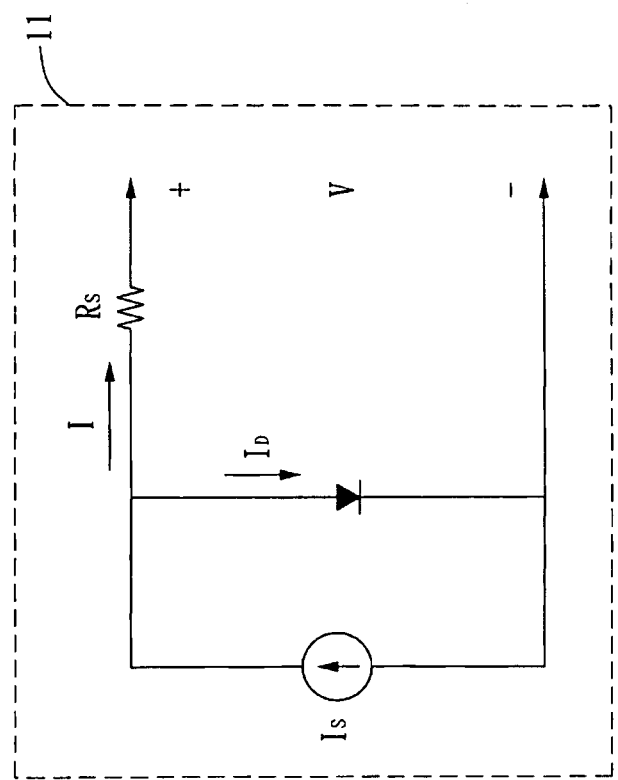
FIG. 3 is an equivalent circuit diagram of a solar cell module according to the present invention solar cell module.

Taking the temperature effect into account, the short-circuit current $I_s$ and the reverse saturation current $I_o$ in (1) can be expressed as:

$$I_s = [I_{so} + K_i(T - T_r)] \cdot \frac{S}{1000} \quad (2)$$

$$I_o = I_{or} \left[ \frac{T}{T_r} \right]^3 e^{\left[ \frac{qE_{gap}}{KT} \left( \frac{1}{T_r} - \frac{1}{T} \right) \right]} \quad (3)$$

where $I_{so}$: the short-circuit current under the irradiance of 1 kW/m² and the temperature of $T_r$;

$I_s$: the short-circuit current under the irradiance of S and the temperature of T;

$K_i$: the temperature parameter of the short-circuit current of the solar cell module;

$I_{or}$: the reverse saturation current of the solar cell module under the reference temperature of $T_r$;

$I_o$: the reverse saturation current of the solar cell module at the temperature of T;

$E_{gap}$: the energy gap of the semiconductor material in the solar cell module (for example, $E_{gap} \cong 1.1$ ev for silicon);

From equation (2), by defining the current as $$I_D \equiv I_o \left[ e^{\frac{q}{AKT}(V+IR_s)} - 1 \right] \quad (4)$$

we obtain the following equation (5) according to the equivalent circuit in FIG. 3, $$I = I_s - I_o \left[ e^{\frac{q}{AKT}(V+IR_s)} - 1 \right] \quad (5)$$

From equation (5), we obtain $$V = -IR_s + \left( \frac{AKT}{q} \right) \ell n \left[ \frac{I_s + I_o - I}{I_o} \right] \quad (6)$$

Therefore, the output power of the solar-powered module is $$P = VI = \left( \frac{AKT}{q} \right) I \ell n \left[ \frac{I_s + I_o - I}{I_o} \right] - I^2 R_s \quad (7)$$

By differentiating equation (7) and setting the differentiated result as zero, we obtain a relation as stated in equation (8) that is required when the maximum power is output.

$$\left( \frac{AKT}{q} \right) \ell n \left[ \frac{I_s + I_o - I^*}{I_o} \right] - \frac{\left( \frac{AKT}{q} \right) I^*}{I_s + I_o - I^*} - 2I^* R_s = 0 \quad (8)$$

where V*, I* denote the output voltage and the output current as the maximum power is output. Therefore, the maximum output power P* is expressed as:

$$P^* = V^* I^* = n_s \left( \frac{AKT}{q} \right) I^* \ell n \left[ \frac{n_p I_s + n_p I_o - I^*}{n_p I_o} \right] - I^{*2} R_s \quad (9)$$

which can be simplified as:

$$P^* = n_s \left( \frac{AKT}{q} \right) I^* \ell n \left[ \frac{n_s \left( \frac{AKT}{q} \right) I^{*2}}{(P^* - I^{*2} R_s) n_p I_o} \right] - I^{*2} R_s \quad (10)$$

Figure 4:
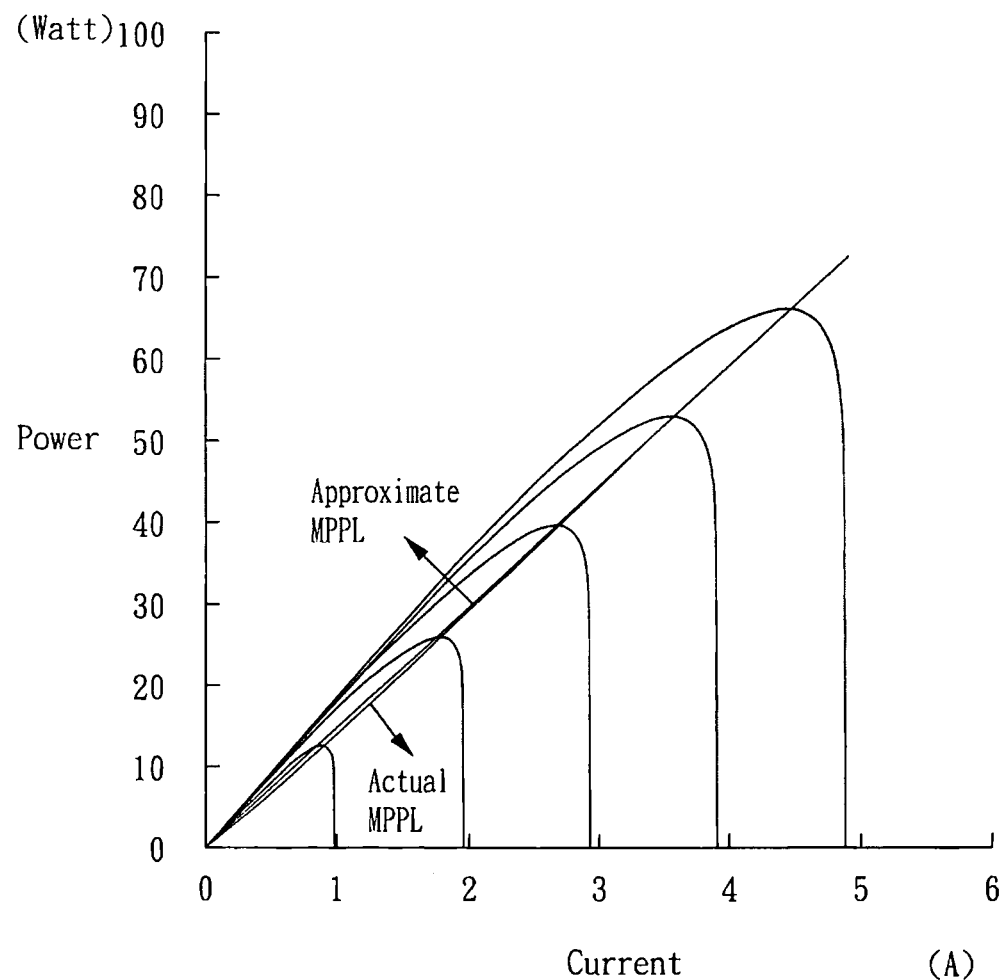
FIG. 4 shows the characteristics curve of a solar cell module with maximum output power according to the present invention.

Therefore, as long as the characteristics curve of the maximum power of the solar-powered module is known, the illumination can be obtained. The linear approximation and actual maximum power can be compared as shown in FIG. 4. Consequently, the solar-powered module is operated with the maximum output power and is capable of measuring the present illumination.

Figure 5:
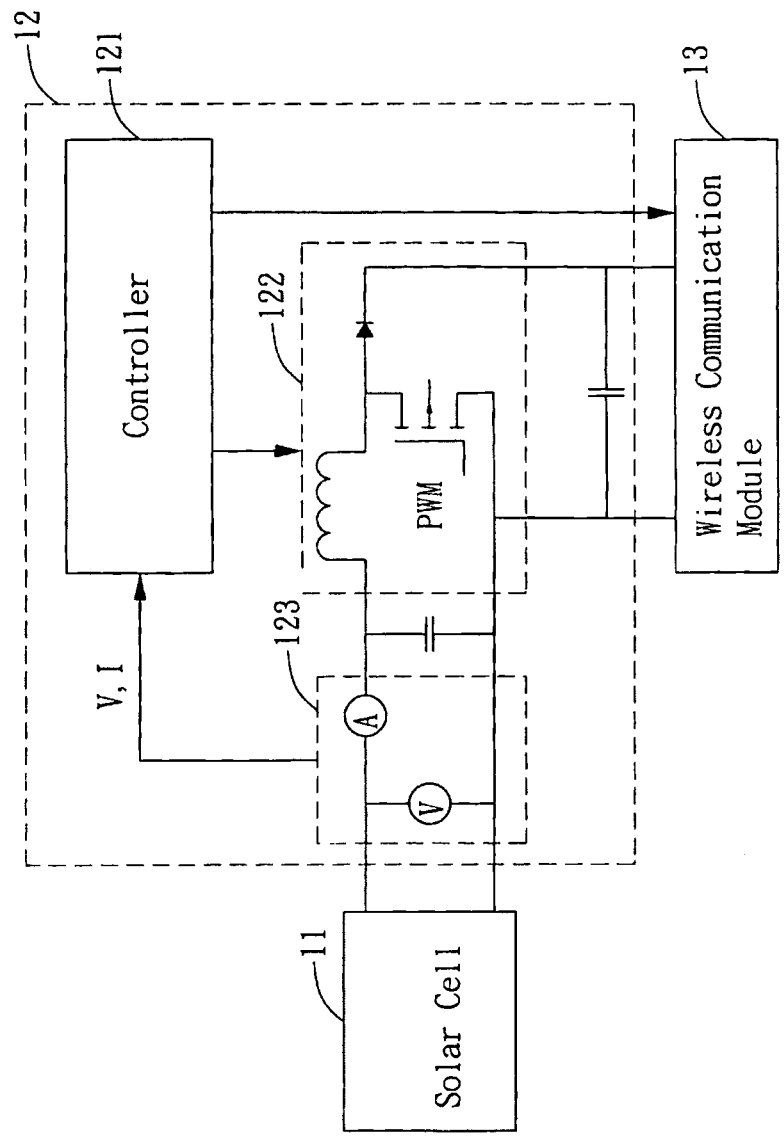
FIG. 5 is a detailed functional block diagram of a solar-powered wireless communication module with daylight intensity measurement according to the present invention.

Please refer to FIG. 5, which is a detailed functional block diagram of a solar-powered wireless communication module with daylight intensity measurement according to the present invention. Compared to FIG. 2, the control circuit 122 of the MCU 12 uses pulse width modulation (PWM) to control a p-channel metal-oxide-semiconductor field effect transistor (p-MOSFET). The MCU 12 further comprises at least a plurality of diodes, inductors and capacitors. The MCU 12 communicates using serial communication modules and wireless communication module 13. The wireless communication module 13 uses ZigBee protocol, but is not limited thereto. In one embodiment of the present invention, anyone with ordinary skill in the art can use infrared (IR), radio frequency (RF) or Bluetooth to operate the wireless communication module within the scope of the present invention. The measured illumination can be transmitted using the ZigBee-based wireless communication module to the control end. The present invention can be used in illumination control for lamps or light-emitting diodes in smart homes. When the daylight is strong enough, the daylight resource can be used to reduce the number as well as the illumination of the lamps. Meanwhile, the AC utility is used to turn on the lamps only when the daylight is weak.

According to the above discussion, the present invention discloses solar-powered wireless communication module with daylight intensity measurement using a solar cell module as an optical sensor and a power supply. Therefore, the present invention is useful, novel and non-obvious.

Although this invention has been disclosed and illustrated with reference to particular embodiments, the principles involved are susceptible for use in numerous other embodiments that will be apparent to persons skilled in the art. This invention is, therefore, to be limited only as indicated by the scope of the appended claims.

What is claimed is:

1. A solar-powered wireless communication module with daylight intensity measurement, comprising:
    a solar cell module, capable of converting solar energy into electricity;
    a Microcontroller Unit (MCU), coupled to the solar cell module for detecting and outputting values regarding the voltage and the current of the electricity converted from the solar cell module; and
    a wireless communication unit, powered by the electricity from the solar cell module and coupled to the MCU for transmitting values outputted from the MCU to a control end;
    wherein the solar cell module is used as an optical sensor for measuring illumination and a power supply, and a maximum output power of the solar cell module is proportional to a sunlight intensity; and
    wherein the control end is an illumination control unit, and the brightness of a lamp is adjusted by the illumination control unit according to measured illumination using the solar cell module as the optical sensor.

2. The solar-powered wireless communication module with daylight intensity measurement as recited in claim 1, wherein the illumination control unit is an adjustable electronic ballast.

3. The solar-powered wireless communication module with daylight intensity measurement as recited in claim 1, wherein the wireless communication module performs wireless communication using one of ZigBee protocol, infrared, radio frequency and Bluetooth.

4. The solar-powered wireless communication module with daylight intensity measurement as recited in claim 1, wherein the Microcontroller Unit comprises a controller and a control circuit.

5. The solar-powered wireless communication module with daylight intensity measurement as recited in claim 4, wherein the control circuit uses pulse width modulation (PWM) to control a p-channel metal-oxide-semiconductor field effect transistor (p-MOSFET).

6. The solar-powered wireless communication module with daylight intensity measurement as recited in claim 4, wherein the micro control unit further comprises a plurality of diodes, inductors and capacitors.

* * * * *